(12) United States Patent
Wagener et al.

(10) Patent No.: US 7,641,219 B2
(45) Date of Patent: Jan. 5, 2010

(54) ARRANGEMENT FOR FIXING THE GAS GENERATOR OF AN AIR BAG UNIT

(75) Inventors: Keit Wagener, Bissendorf (DE); Thomas Fangmann, Dinklage (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 384 days.

(21) Appl. No.: 10/598,368

(22) PCT Filed: Feb. 25, 2005

(86) PCT No.: PCT/DE2005/000336

§ 371 (c)(1), (2), (4) Date: Aug. 25, 2006

(87) PCT Pub. No.: WO2005/082683

PCT Pub. Date: Sep. 9, 2005

(65) Prior Publication Data

US 2008/0238044 A1 Oct. 2, 2008

(30) Foreign Application Priority Data

Feb. 27, 2004 (DE) ........................ 10 2004 010 144

(51) Int. Cl.
*B60R 21/20* (2006.01)

(52) U.S. Cl. .................... 280/728.2; 403/203; 285/317; 24/484

(58) Field of Classification Search .............. 280/728.2; 24/3.11, 484, 537; 285/317, 319, 321; 403/203

See application file for complete search history.

(56) References Cited

U.S. PATENT DOCUMENTS

| 5,487,556 | A  | * | 1/1996  | Jenkins et al. ........... 280/728.2 |
| 5,597,176 | A  |   | 1/1997  | Kikuchi |
| 6,361,064 | B1 | * | 3/2002  | Hopf et al. ............... 280/728.1 |
| 2002/0175500 | A1 |   | 11/2002 | Heindl |
| 2003/0020267 | A1 | * | 1/2003  | Scholz ...................... 280/741 |
| 2003/0214119 | A1 |   | 11/2003 | Grossmann et al. |

FOREIGN PATENT DOCUMENTS

| DE | 19533707 A1 | 3/1996 |
| DE | 69600257    | 10/1998 |
| DE | 19743615 A1 | 4/1999 |
| DE | 10056625 A1 | 6/2002 |
| DE | 20303230 U1 | 8/2003 |
| EP | 1112901 A2  | 7/2001 |
| GB | 2291015 A   | 1/1996 |
| JP | 2001213326  | 8/2001 |

* cited by examiner

*Primary Examiner*—Paul N. Dickson
*Assistant Examiner*—Timothy Wilhelm
(74) *Attorney, Agent, or Firm*—McGlew and Tuttle, P.C.

(57) ABSTRACT

An arrangement for fixing a gas generator of an air bag unit. The gas generator is securely fixed in the generator chamber and both radial and axial tolerances, in particular of the gas generator, are compensated using a plate-like, spring-elastic fastening element that is pressed in the area of the end of the gas generator lying opposite the fixed bearing between the outer circumference thereof and the inner circumference of the generator chamber axially projecting through the gas generator. After the pressing in, the fastening element is arched into the generator chamber in the axial direction in a section between the outer wall of the gas generator and the inner wall of the generator chamber in the axial direction.

20 Claims, 2 Drawing Sheets

ARRANGEMENT FOR FIXING THE GAS GENERATOR OF AN AIR BAG UNIT

CROSS REFERENCE TO RELATED APPLICATIONS

This application is a United States National Phase application of International Application PCT/DE2005/000336 and claims the benefit of priority under 35 U.S.C. §119 of German Patent Application DE 10 2004 010 144.2 filed Feb. 27, 2004, the entire contents of which are incorporated herein by reference.

FIELD OF THE INVENTION

The present invention pertains to an arrangement for fixing the gas generator of an air bag unit, and in particular for fixing the gas generator in the generator chamber and for sealing the generator chamber against the environment. The present invention pertains to an air bag unit of typical design with an air bag housing, to which an air bag is fixed, and with a generator chamber connected to the air bag housing, which generator chamber accommodates the gas generator for releasing a gas that fills the air bag in case of a collision.

BACKGROUND OF THE INVENTION

Air bag units with the basically above-described design belong to the state of the art. With regard to the large number of such safety features being found in some modern vehicles, these safety features have very different shapes and different embodiments in detail. With the increasing number of air bag units installed in a vehicle, these represent a cost factor that is of increasing consequence. With regard to production costs, therefore, efforts are being made to keep the design of air bag systems simple, and in particular also to reduce the number of their components, in order to finally reduce the costs with a lower mounting effort in their assembly. Moreover, simplification measures of this type are desired with regard to the often highly limited space for components in the vehicle. One point to which attention is given here is the fastening of the gas generator in the generator housing. It is essential here to take several marginal conditions into account. Thus, the gas generator must be securely fixed in position in the housing and, with regard to comfort, it must be made sure that vibrations and twistings resulting during the motion of the vehicle do not lead to rattling noises or squeaking noises due to parts rubbing against one another. Furthermore, the generator housing must be reliably sealed in order to prevent the gas that flows out of the generator for inflating the air bag in case of a collision from escaping out of the air bag unit into the environment in an uncontrolled manner. These requirements are to be met, taking into account the tolerances occurring in practice in relation to the dimensional stability of the components.

A special adapter for fixing the gas generator in the generator housing, which is utilized to meet the above-mentioned requirements, is described in EP 0 722 861 B1. The adapter is pushed onto the free axial end of the gas generator and fastened thereto by means of a frictional contact connection. For this, a plurality of axially sloping teeth are arranged on the circumference at the inner wall of the element, which has a hollow cylindrical shape. The adapter, which is open on one side for accommodating the gas generator, is fastened to the housing of the air bag unit by means of a flange arranged on the bottom, sealing this bottom, by means of welding, soldering or gluing together. However, provided that additional sealing measures are not taken in the area of the flange, leakage problems may possibly occur with this solution in view of the frictionally engaged press fit of the gas generator and adapter. Also, it does not appear to be certain that the arrangement guarantees the necessary mechanical stability over the longer term in case of the stress occurring in practice.

An air bag unit, in which an elastic sealing and uncoupling ring is arranged between the gas generator and the air bag housing, is described by DE 197 43 615 A1. However, the solution is devoted, on the surface, to the radial uncoupling of the gas generator against the adjacent housing and the sealing of the generator chamber. A compensation of radial tolerances between the gas generator and the generator chamber is advantageously achieved. In its basic embodiment, the sealing and uncoupling ring abuts against a stop shoulder at the axial end of the generator chamber. A fixing of the gas generator in the axial direction is not achieved in this embodiment by the ring alone. For this purpose, an additional cover is necessary or the ring must be embodied with an additional stopping means according to an embodiment of the solution described in the patent. Consequently, the axial fixing of the gas generator is achieved; however, the geometry of the sealing and uncoupling ring becomes more complicated. Moreover, tolerances of the axial measurements of the gas generator cannot or can hardly be compensated with this solution.

SUMMARY OF THE INVENTION

The object of the present invention is to provide a solution, by means of which a gas generator can be securely fixed in the generator chamber, and both radial and axial tolerances, in particular of the gas generator, can be compensated. At the same time, a reliable sealing of the generator housing against the environment shall be achieved.

According to the invention, the arrangement for fixing the gas generator of an air bag unit pertains to an air bag unit of this type having the usual construction, which essentially consists of an air bag housing with the inflatable air bag fixed therein, a generator chamber that is connected to the air bag housing, the gas generator being connected to a firing unit, as well as a diffuser. In a manner known per se, the gas generator, which is accommodated by the generator chamber, is mounted in a fixed bearing with an axial end. The fixed bearing, whose specific structure is not critical to the present invention, may, for example, be embodied by the inner contour of the generator chamber, which preferably consists of a plastic, which inner contour is adapted to the outer contour of the gas generator.

The present invention is used for fixing the gas generator at its free axial end lying opposite this fixed bearing. In a manner essential to the present invention, a plate-like, spring-elastic fastening element is pressed in this area between the outer circumference of the gas generator and the inner circumference of the generator chamber axially projecting through the gas generator. After the pressing in, the fastening element is arched into the generator chamber in the axial direction in a section between the outer wall of the gas generator and the inner wall of the generator chamber. As a result of this, the fastening element is pretensioned, such that it is supported, with its outer circumference, in a nonpositive manner against the inner wall of the generator chamber and thus clings or digs into to the inner wall. Thus, the fastening element at least partially embraces the bottom of the gas generator formed at this end and seals, in the case of a collision, the generator chamber against the environment with regard to the gas flowing out of the gas generator.

A reliable fixing of the gas generator in the generator chamber is achieved with the arrangement embodied in the manner described. Both the radial manufacturing tolerances of the gas generator or of the gas generator jacket and/or of the generator chamber and axial tolerances of the gas generator can be compensated without any problems by means of pressing on the plate-like fastening element, since the fastening element is quasi-automatically pushed open so wide during the pressing that it is arranged in a positive lock on the generator outer surface and clings to the inner surface of the generator chamber. Possible axial tolerances are compensated simply via the press-in depth of the fastening element. Moreover, it is particularly advantageous that during the pressing, the fastening element is arched into the interior of the generator chamber in a radial section between the generator outer wall and the chamber inner wall, such that the gas generator is fixed in the generator chamber with a predetermined pretension. This is particularly an advantage with regard to the achieved sealing of the generator chamber, since, when the air bag is triggered, i.e., in case of the escape of gas from the gas generator and an increase in the internal pressure in the generator chamber connected therewith, the arching of the fastening element is pressed in the outward direction, and the fastening element, which consequently increasingly straightens as well as increases slightly in its diameter, clings or digs even more rigidly to the chamber inner wall.

In one embodiment of the present invention, the fastening element, which is almost circular with regard to its outer contour, has an inner lug around its center in an inner area. Consequently, it is possible that the gas generator partially projects through the fastening element in the area of the inner lug. In this embodiment, the bottom of the gas generator has a graded contour in the axial direction, such that the gas generator projects through the inner lug of the fastening element in a radial inner area, but its bottom is nevertheless partially contained by the fastening element.

According to an advantageous embodiment of the arrangement according to the present invention, provisions are, moreover, made that the gas generator can be connected to the firing unit via a plug in the area of the inner lug embodied in the fastening element.

According to one possible embodiment, the fastening element is a stamped metal part made of sheet steel. Consequently, it is also possible to connect the gas generator in an electrically conductive manner to the vehicle ground. For this purpose, a plug-in strap to be connected to the grounding strap is provided, for example, at the fastening element.

As a variant of this, it is, however, also possible to make the fastening element out of a composite material and to manufacture it, for example, out of a sheet steel, which is extrusion-coated about the inner lug of the fastening element and on the inner contour thereof with a plastic. Consequently, by means of a corresponding choice of the materials, the sealing behavior in the area of the generator bottom can, if necessary, still be improved, since the generator bottom is pressed into the plastic surrounding the inner lug during the pressing of the fastening element. According to a particularly advantageous embodiment of this variant, the fastening element can, moreover, be snapped onto the gas generator with its inner lug. As a result, it can already be premounted at the gas generator and inserted together with same into the generator chamber during the assembly of the air bag unit and pressed between the gas generator and the generator chamber.

According to a particularly advantageous variant, the fastening element has a microprofiled section on its outer circumference. Consequently, the clinging or digging to the inner wall of the generator chamber is advantageously favored during the pressing of the fastening element. Preferably, microcorners or teeth are arranged distributed on the outer circumference of the fastening element for this purpose.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
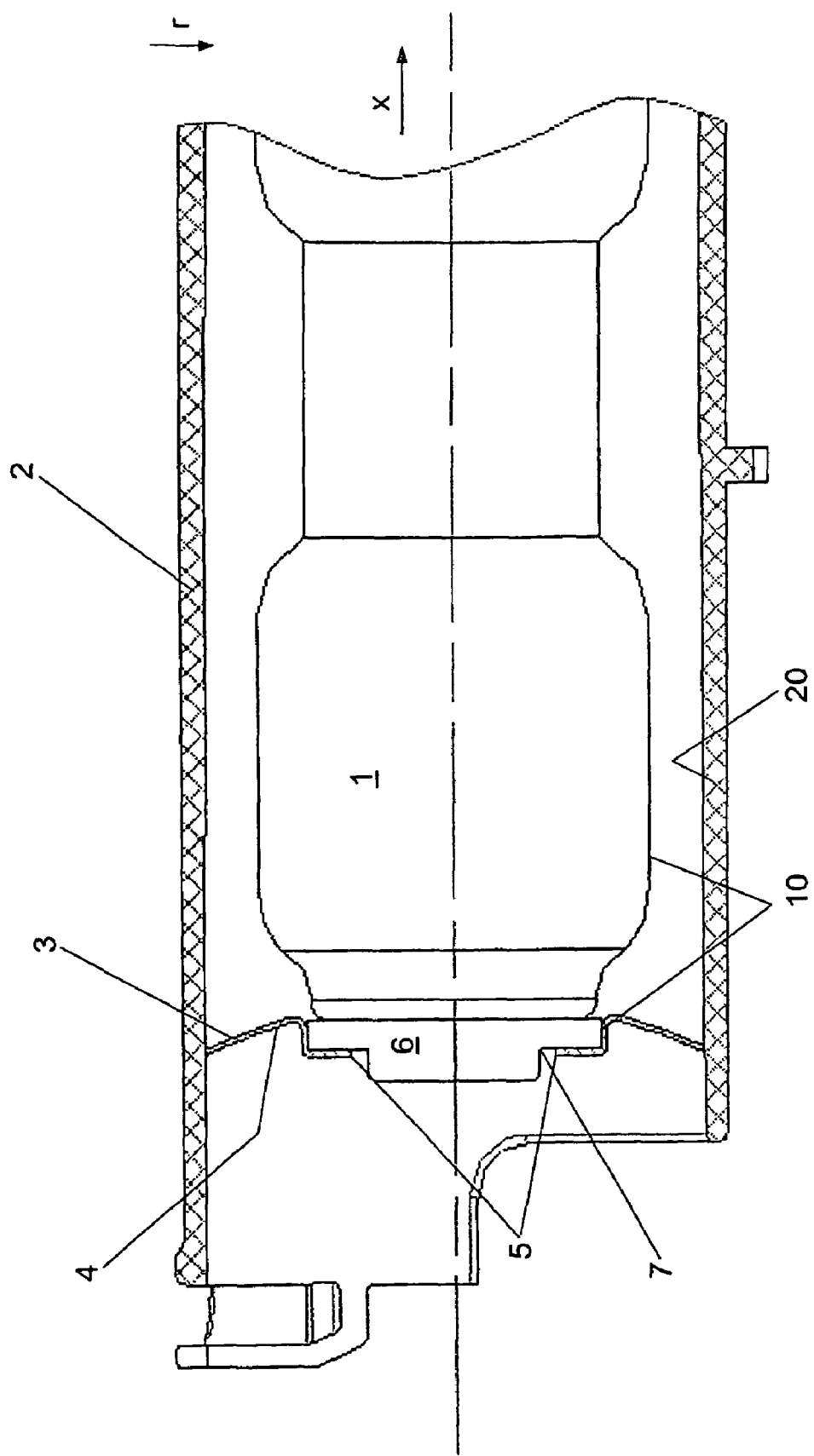
FIG. 1 is a schematic view of a basic embodiment of the present invention.

Referring to the drawings in particular, FIG. 1 shows the present invention in a schematic view according to a basic embodiment. The figure concerns only the cutaway portion of an air bag unit which is otherwise not further explained. FIG. 1 shows a part of the generator chamber housing 2 with the gas generator 1, likewise shown only partially, arranged therein. The remaining components of the air bag unit, whose design is well known, are not shown in the drawing. The diffuser, which is likewise not shown in this respect, which provides for a distribution of the gas stream for an inflation of the air bag that is as uniform as possible, can be embodied either at the generator 1 itself and/or by a corresponding profiled section of the inner wall of the generator housing 2.

In the example shown, the gas generator 1 is embodied as an almost cylindrical part that is essentially rotationally symmetrical in relation to the longitudinal axis or the axial direction x. At its one axial end, which is not shown in the figure, the gas generator 1 is mounted in a fixed bearing. However, following the basic idea of the present invention, it is fixed at the opposite free axial end by means of the plate-like, spring-elastic fasting element 3 in the generator chamber 2. The fastening element 3, which has an inner lug 5 in its inner area in relation to the radial direction r, is pressed between the outer wall 10 of the gas generator 1 and the inner wall 20 of the generator chamber 2 during the insertion or after the insertion of the gas generator 1 into the generator chamber 2. The fastening element 3 is thus installed in the area of its inner lug 5 at a section of the generator bottom 6, partially embracing same. At the same time, the plate-like part (fastening element 3) is arched into the interior of the generator chamber 2 in a section 4 between the generator outer wall 10 and the chamber inner wall 20, such that, in the installed state, it has a concave arch in relation to the x direction. Consequently, the gas generator 1 is fixed in the generator housing under pretension. Thus, on its outer circumference, the fastening element 3 clings or digs to the inner wall 20 of the generator housing 1.

It is obvious that possible radial tolerances of the gas generator 1 and/or of the generator chamber 2 in connection with the pressing on the fastening element 3 and the shape of the fastening element, which is obvious from the drawing, being adjusted only during a preferably elastic deformation, can be compensated in a very simple manner. However, tolerances in relation to the axial dimensions of the gas generator 1 can, furthermore, also be easily compensated via the press-in depth of the fastening element 3.

The gas generator 1 can advantageously be connected to a firing unit (ignitor), which is likewise not visible in the drawing, via the inner lug 5 by means of a plug, which is not shown here. In addition, it is possible by means of the inner lug 5 of the fastening element 3 that, as in the example shown, this fastening element 3 is partially projected through by the gas generator 1 in the area of a gradation 7 of the generator outer contour.

The pretension achieved by the arching 4 of the fastening element 3 has an equally advantageous effect on the secure fixing of the gas generator 1 and the sealing of the generator chamber 2 against the escape of gas in the case of a firing of the gas generator 1. It can actually be observed that the fastening element 3 is pressed outwardly in the area of this arching, in case of an increase in the internal pressure of the generator chamber 2 occurring as a result of the escape of gas from the gas generator 1, towards the x direction shown by the arrow, extensively without changing its position, but while changing its shape, and by means of the responsive shape change as well as the generator chamber 2, clings or digs even more rigidly to the inner wall 20 thereof in a reliable sealing manner.

Figure 2:
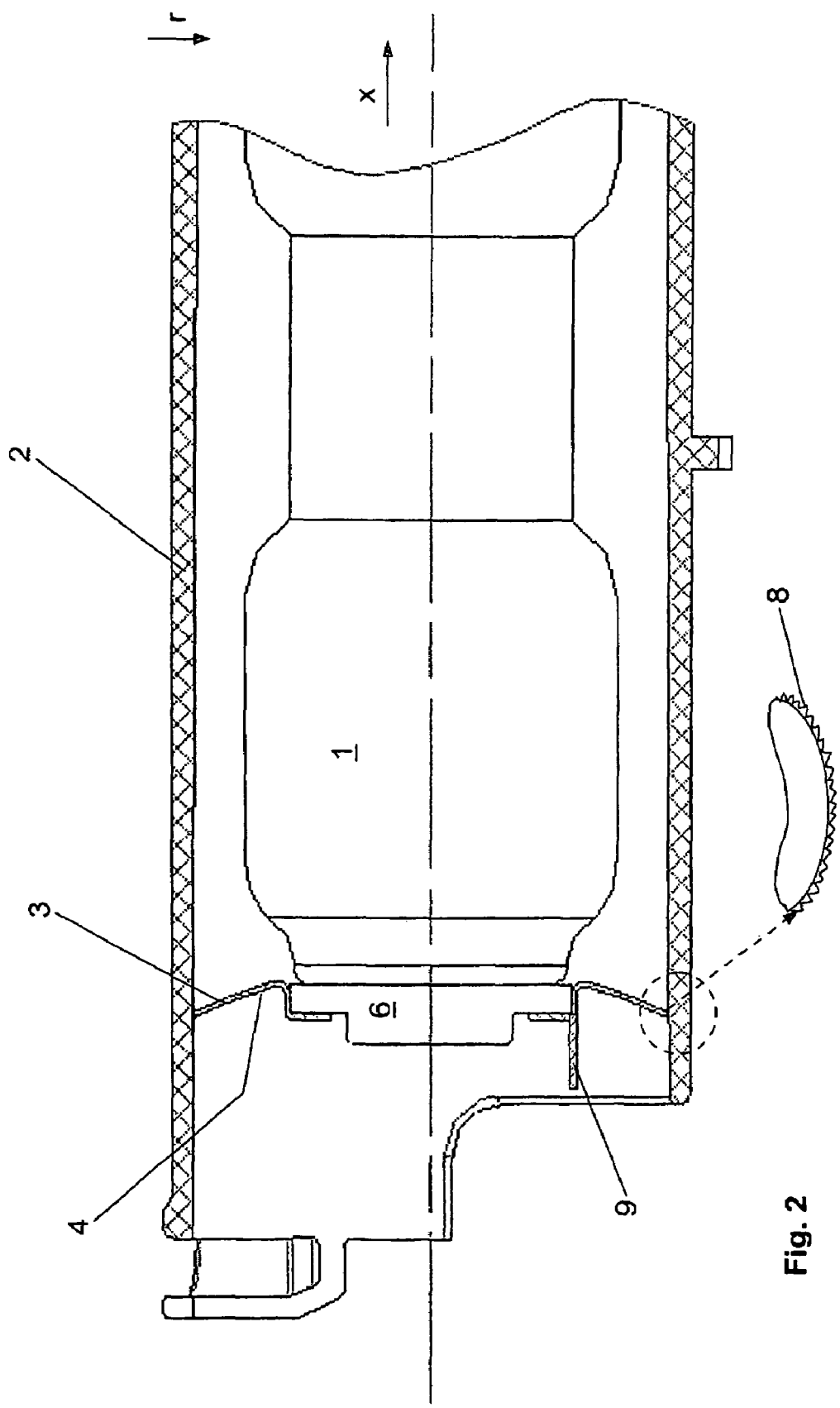
FIG. 2 is a schematic view showing a variant of the embodiment according to FIG. 1.

An embodiment of the arrangement according to the present invention which is somewhat modified compared to FIG. 1 is shown in FIG. 2. Here, the fastening element 3 is provided with a microprofiled section on its outer circumference. This is shown by the enlarged cutaway portion, viewed towards the x direction. In the example, microcorners 8 are arranged on the circumference of the fastening element 3. The clinging of the fastening element 3, which otherwise has the same design in relation to the clamping and sealing action, to the inner wall 20 of the generator housing 2 is favored by this structuring. As already shown, the fastening element 3 is embodied, for example, as a stamped metal part made of sheet steel. Consequently, it is possible, as in the example shown in FIG. 2, to connect the gas generator 1 to the ground potential of the vehicle via a grounding strap 9 connected to other metallic parts of the vehicle.

However, it is also conceivable to manufacture the fastening element 3 from a composite material with an inner lug 5 bordered by plastic, whereby particularly this embodiment advantageously makes it possible to pretension the fastening element 3 by snapping on or clipping on at the gas generator 1.

While specific embodiments of the invention have been shown and described in detail to illustrate the application of the principles of the invention, it will be understood that the invention may be embodied otherwise without departing from such principles.

The invention claimed is:

1. An arrangement for fixing a gas generator of an air bag unit with an air bag housing with an inflatable air bag fixed therein, the arrangement comprising:
   a generator chamber connected to the air bag housing, a gas generator connected to a firing unit, as well as a diffuser, for the gas flowing into the air bag from said gas generator if the air bag is fired, said gas generator chamber having an inner wall; and
   a spring-elastic fastening element, whereby said gas generator is accommodated by said generator chamber and said gas generator is mounted at an axial end thereof, in a fixed bearing, said spring-elastic fastening element being pressed in an area of a free axial end of said gas generator lying opposite said fixed bearing between an outer circumference thereof and an inner circumference of said generator chamber axially overlapping said gas generator, said fastening element in a pretensioned state, arched into said generator chamber in the axial direction in a section between an outer wall of said gas generator and said inner wall of said generator chamber, whereby said fastening element digs with an outer circumference thereof to said inner wall of said generator chamber, at least partially embracing said bottom of said gas generator, which is formed at this axial end, and sealing said generator chamber, said fastening element having a radial outer edge, and said radial outer edge digging into said inner wall of said generator chamber.

2. An arrangement in accordance with claim 1, wherein said fastening element has an inner lug in a middle inner area of said fastening element.

3. An arrangement in accordance with claim 2, wherein said fastening element partially projects through in the area of said inner lug, whereby said bottom of said gas generator, which has a gradation in the axial direction on its contour, is partially embraced by said inner lug of said fastening element.

4. An arrangement in accordance with claim 2, wherein said gas generator has a firing unit plug in area in a region of said inner lug formed in said fastening element.

5. An arrangement in accordance with claim 1, wherein said fastening element is a stamped metal part made of sheet steel.

6. An arrangement in accordance with claim 5, wherein a grounding strap connected to the vehicle ground connection is arranged at said fastening element.

7. An arrangement in accordance with claim 1, wherein said fastening element consists of a composite material.

8. An arrangement in accordance with claim 7, wherein said fastening element comprises sheet steel extrusion-coated with plastic in a region around said inner lug and on said inner contour thereof.

9. An arrangement in accordance with claim 8, wherein said fastening element can be snapped onto said gas generator with said fastening element having an inner lug, such that said fastening element is premounted on said gas generator, inserted together with said gas generator into said generator chamber and pressed between said gas generator and said generator chamber.

10. An arrangement in accordance with claim 1, wherein said fastening element has, on an outer circumference, a microprofiled section that is favorable to a clinging of said fastening element to said inner wall of said generator chamber.

11. An arrangement in accordance with claim 10, wherein said microcorners are arranged distributed on the outer circumference of said fastening element.

12. An air bag unit arrangement comprising:
    a generator chamber having an inner wall and axial ends;
    a gas generator arranged in said generator chamber, said gas generator having an end;
    a fastening element arranged at said end of said gas generator and between said gas generator and said inner wall of said generator chamber to securely fasten said gas generator to said generator chamber, said fastening element having an outer circumference arranged axially inward of said axial ends of said generator chamber, said fastening element being shaped and sized to deform into an arched position as said fastening element is pressed into said generator chamber, said arched position biasing said outer circumferential surface against said inner wall of said generator chamber, whereby said fastening element clings with said outer circumference thereof to said inner wall, at least partially embracing said one end of said gas generator, said fastening element being completely arranged within said generator chamber.

13. An arrangement in accordance with claim 1, wherein: said fastening element is completely arranged within said generator chamber.

14. An arrangement for fixing a gas generator of an air bag unit with an air bag housing with an inflatable air bag fixed therein, the arrangement comprising:
   a generator chamber connected to the air bag housing, a gas generator connected to a firing unit, as well as a diffuser, for the gas flowing into the air bag from said gas generator if the air bag is fired, said gas generator chamber having an inner wall; and
   a spring-elastic fastening element, whereby said gas generator is accommodated by said generator chamber and said gas generator is mounted at an axial end thereof, in a fixed bearing, said spring-elastic fastening element being pressed in an area of a free axial end of said gas generator lying opposite said fixed bearing between an outer circumference thereof and an inner circumference of said generator chamber axially projecting through said gas generator, said fastening element in a pretensioned state, arched into said generator chamber in the axial direction in a section between an outer wall of said gas generator and said inner wall of said generator chamber, whereby said fastening element clings with an outer circumference thereof to said inner wall of said generator chamber, at least partially embracing said bottom of said gas generator, which is formed at this axial end, and sealing said generator chamber;
   a grounding strap connected to a vehicle ground connection and arranged at said fastening element.

15. An air bag unit arrangement comprising:
   a generator chamber having an inner wall;
   a gas generator fixed at one end and having an opposite end; and
   a fastening element connected to said opposite end of said gas generator and being pressed into said generator chamber with an outer circumferential surface in contact with said inner wall with said fastening element in an arched position in said generator chamber between an outer wall of said gas generator and said inner wall, whereby said fastening element clings with an outer circumference thereof to said inner wall, at least partially embracing said bottom of said gas generator sealing said generator chamber;
   a grounding strap connected to a vehicle ground connection and arranged at said fastening element.

16. An arrangement in accordance with claim 12, wherein said fastening element can be snapped onto said gas generator with said fastening element having an inner lug, such that said fastening element is premounted on said gas generator, inserted together with said gas generator into said generator chamber and pressed between said gas generator and said generator chamber.

17. An arrangement in accordance with claim 12, wherein: said outer circumference of said fastening element is shaped, and the biasing of said outer circumferential surface is of a magnitude, to have said outer circumferential surface dig into said inner wall of said generator chamber.

18. An arrangement in accordance with claim 12, wherein: said arched position of said fastening element is shaped to have axial movement of said gas generator increase a biasing force of said outer circumferential surface against said inner wall of said generator chamber.

19. An arrangement in accordance with claim 12, wherein: said arched position of said fastening element is shaped to have axial movement in a first direction of said gas generator increase a biasing force of said outer circumferential surface against said inner wall of said generator chamber, said arched position of said fastening element is shaped to have axial movement in a second direction opposite to said first direction decrease a biasing force of said outer circumferential surface against said inner wall of said generator chamber.

20. An arrangement for fixing a gas generator of an air bag unit with an air bag housing with an inflatable air bag fixed therein, the arrangement comprising:
   a generator chamber connected to the air bag housing, a gas generator connected to a firing unit, as well as a diffuser, for the gas flowing into the air bag from said gas generator if the air bag is fired, said gas generator chamber having an inner wall; and
   a spring-elastic fastening element, whereby said gas generator is accommodated by said generator chamber and said gas generator is mounted at an axial end thereof, in a fixed bearing, said spring-elastic fastening element being pressed in an area of a free axial end of said gas generator lying opposite said fixed bearing between an outer circumference thereof and an inner circumference of said generator chamber axially overlapping said gas generator, said fastening element in a pretensioned state, arched into said generator chamber in the axial direction in a section between an outer wall of said gas generator and said inner wall of said generator chamber, whereby said fastening element digs with an outer circumference thereof to said inner wall of said generator chamber, at least partially embracing said bottom of said gas generator, which is formed at this axial end, and sealing said generator chamber, said fastening element being completely arranged within said generator chamber.

* * * * *